United States Patent
Yang (10) Patent No.: US 8,500,428 B2
(45) Date of Patent: Aug. 6, 2013

(54) SCRAPING UNIT OF A MACHINE FOR MAKING COTTON CANDY

(76) Inventor: I-Chiang Yang, Changhua County (TW)

(*) Notice: Subject to any disclaimer, the term of this patent is extended or adjusted under 35 U.S.C. 154(b) by 440 days.

(21) Appl. No.: 12/927,562

(22) Filed: Nov. 17, 2010

(65) Prior Publication Data

US 2012/0121746 A1    May 17, 2012

(51) Int. Cl.
*A23G 3/10* (2006.01)
*A23G 3/02* (2006.01)
*A23G 3/34* (2006.01)

(52) U.S. Cl.
USPC ........... 425/9; 425/176; 425/179; 425/218; 425/227; 425/438; 426/512; 426/517

(58) Field of Classification Search
CPC ........ A23G 3/10; A23G 3/0294; A23G 3/0051; A23G 3/0053; A23G 3/0055
USPC ............. 425/8, 9, 129.1, 175, 176, 179, 184, 425/192 R, 192 S, 202, 215, 218, 226, 227, 425/277, 279, 284, 292, 296, 325, 326.1, 425/333, 378.1, 382.2, 384, 387.1, 438, DIG. 46; 426/103, 307, 496, 503, 512, 516, 517, 426/520
See application file for complete search history.

(56) References Cited

U.S. PATENT DOCUMENTS

| | | | | |
|---|---|---|---|---|
| 1,674,903 A * | 6/1928 | Johnston et al. | ............... | 366/288 |
| 3,221,675 A * | 12/1965 | Hood | ............................ | 426/272 |
| 3,930,043 A * | 12/1975 | Warning et al. | ............... | 426/515 |
| 4,731,001 A * | 3/1988 | Yamamoto et al. | ............... | 425/7 |
| 4,842,502 A * | 6/1989 | Tsumita et al. | .................... | 425/9 |
| 5,110,610 A * | 5/1992 | Cummins | ...................... | 426/496 |
| 5,851,454 A * | 12/1998 | Rutkowski et al. | ............... | 264/8 |
| 5,876,764 A * | 3/1999 | Buttin et al. | ...................... | 425/9 |
| 5,895,668 A * | 4/1999 | Willett | .......................... | 425/148 |
| 7,438,545 B2 * | 10/2008 | Koike et al. | ........................ | 425/9 |
| 7,479,002 B2 * | 1/2009 | Weiss | ................................ | 425/9 |
| 7,641,460 B2 * | 1/2010 | Cretors et al. | ...................... | 425/9 |
| 8,123,507 B2 * | 2/2012 | Yang | .................................. | 425/9 |
| 2001/0041195 A1 * | 11/2001 | Bandou et al. | ..................... | 425/9 |
| 2002/0192319 A1 * | 12/2002 | Todokoro | ........................... | 425/9 |
| 2005/0118314 A1 * | 6/2005 | Ryan | ............................... | 426/517 |
| 2007/0031527 A1 * | 2/2007 | Koike et al. | ........................ | 425/9 |
| 2007/0278706 A1 * | 12/2007 | Cretors et al. | ..................... | 264/8 |
| 2009/0074931 A1 * | 3/2009 | Hawthorne | .................... | 426/517 |

FOREIGN PATENT DOCUMENTS

EP          731193 A1 * 9/1996
GB       2475625     * 5/2011

* cited by examiner

*Primary Examiner* — Seyed Masoud Malekzadeh
(74) *Attorney, Agent, or Firm* — Charles E. Baxley (57) ABSTRACT

A machine for making cotton candy includes a shell, a sugar-spinning unit and a scraping unit. The sugar-spinning unit includes a heater located in the shell for heating and melting sugar, a bowl located around the heater, a lid located on the bowl, and a primary motor for spinning the heater and the bowl to spin the molten sugar. The scraping unit includes a holder located in the shell, a stopper connected to the holder, a lever pivotally connected to the holder, a first scraper attached to the lever, a second scraper pivotally connected to the holder, a hook connected to the second scraper, a spring for connecting the lever to the second scraper, a difference motor, and a crank including an end connected to a mandrel of the difference motor and an opposite end connected to a pin movably inserted in a slot defined in the lever.

6 Claims, 10 Drawing Sheets

SCRAPING UNIT OF A MACHINE FOR MAKING COTTON CANDY

BACKGROUND OF INVENTION

1. Field of Invention

The present invention relates to a machine for making cotton candy, spun sugar or candy floss and, more particularly, to a scraping unit of a machine for making cotton candy.

2. Related Prior Art

Conventionally, cotton candy, spun sugar or candy floss is made in a semiautomatic machine including a sugar-spinning unit and a bowl located around the sugar-spinning unit. Sugar is manually fed into the sugar-spinning unit. The sugar-spinning unit includes a heater for heating and melting the sugar and a motor for spinning the heater to spin the molten sugar toward the bowl. A rod is manually inserted into the bowl so that the spun sugar sticks to the rod. It however requires labor to operate the semiautomatic machine to make the cotton candy. The profit margin is thin because the cost of the cotton candy is high, and the price is low.

There have been automatic machines for making cotton candy. Such an automatic machine includes a sugar-feeding unit, a sugar-spinning unit, a bowl and a rod-feeding unit. Sugar is fed into the sugar-spinning unit from the sugar-feeding unit. The sugar is heated and molten in the sugar-spinning unit and spun into the bowl from the sugar-spinning unit. Rods are sequentially inserted into the bowl so that the spun sugar sticks to the rods, one after another. Some of the spun sugar however sticks to the bowl instead of the rods and becomes stains. The stains would stick to following spun sugar and therefore hinder the sticking of the following spun sugar to following rods. This affects the operation of the automatic machine and increases the cost of the cotton candy.

The present invention is therefore intended to obviate or at least alleviate the problems encountered in prior art.

SUMMARY OF INVENTION

It is the primary objective of the present invention to provide an efficient automatic machine for making cotton candy.

To achieve the foregoing objective, the machine includes a shell, a sugar-spinning unit and a scraping unit. The sugar-spinning unit includes a heater located in and connected to the shell for heating and melting sugar, a bowl coaxially located around the heater, a lid located on the bowl and formed with a first slot, and a primary motor for spinning the heater and the bowl to spin the molten sugar into the bowl from the heater. The scraping unit includes a holder located in and connected to the shell, a stopper connected to the holder, a lever with a second slot defined therein, a first scraper connected to the lever, a second scraper, a hook connected to the second scraper, an axle for pivotally connecting the lever and the second scraper to the holder, a spring for connecting the second scraper to the lever, a difference motor including a mandrel, and a crank including an end connected to the mandrel of the difference motor and an opposite end connected to a pin movably inserted in the second slot defined in the lever. The lever and the second scraper can be pivoted into the bowl through the first slot defined in the lid. The lever can continue to be pivoted after the second scraper is stopped by the stopper so that the first scraper is located against an internal side of the bowl to scrap stains of sugar from the bowl. The lever and the second scraper can be pivoted back so that the second scraper is released from the stopper and pivoted past the first scraper by the spring to scrap the stains of sugar from the first scraper.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
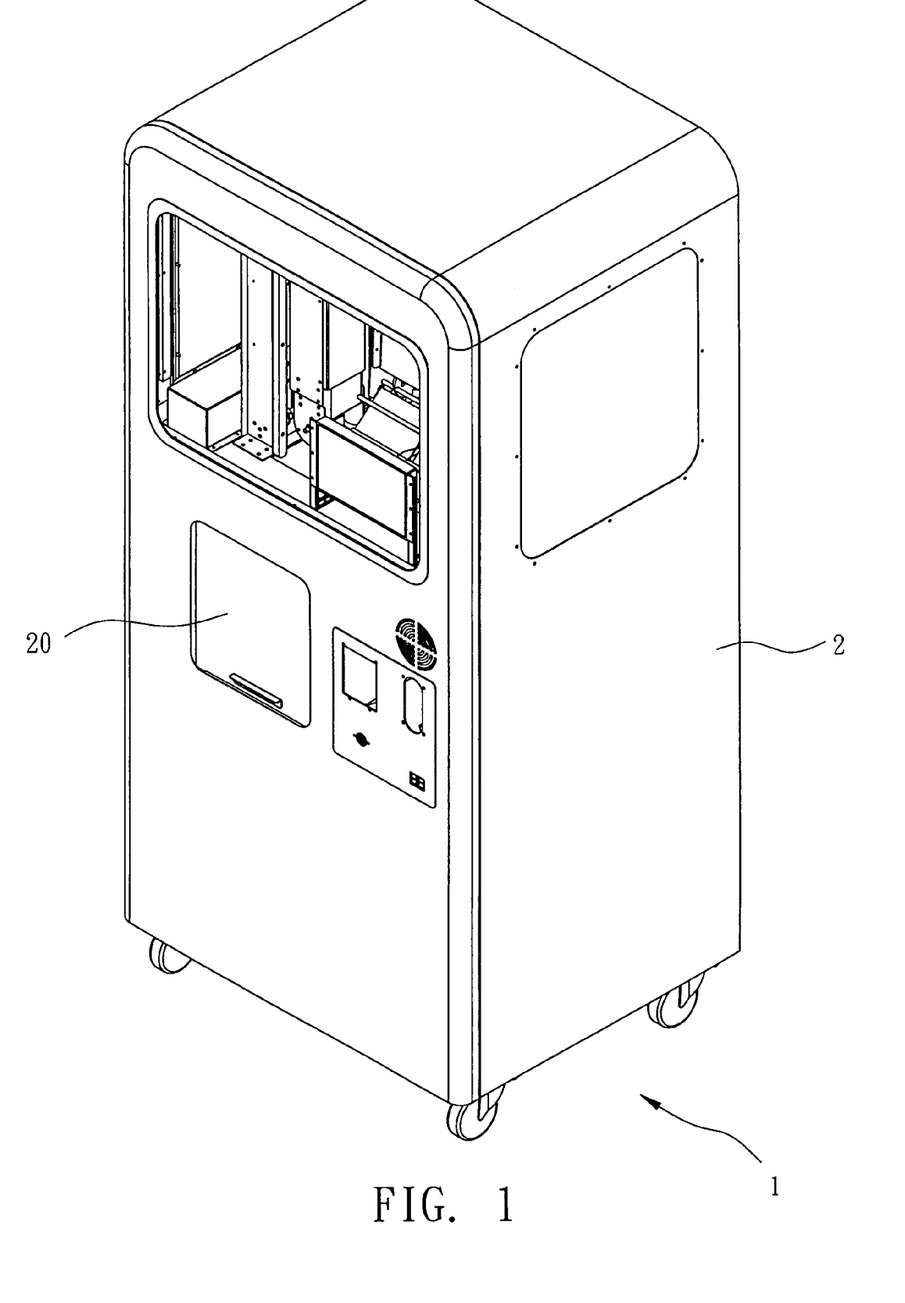
FIG. 1 is a perspective view of a machine for making cotton candy according to the preferred embodiment of the present invention.
Figure 2:
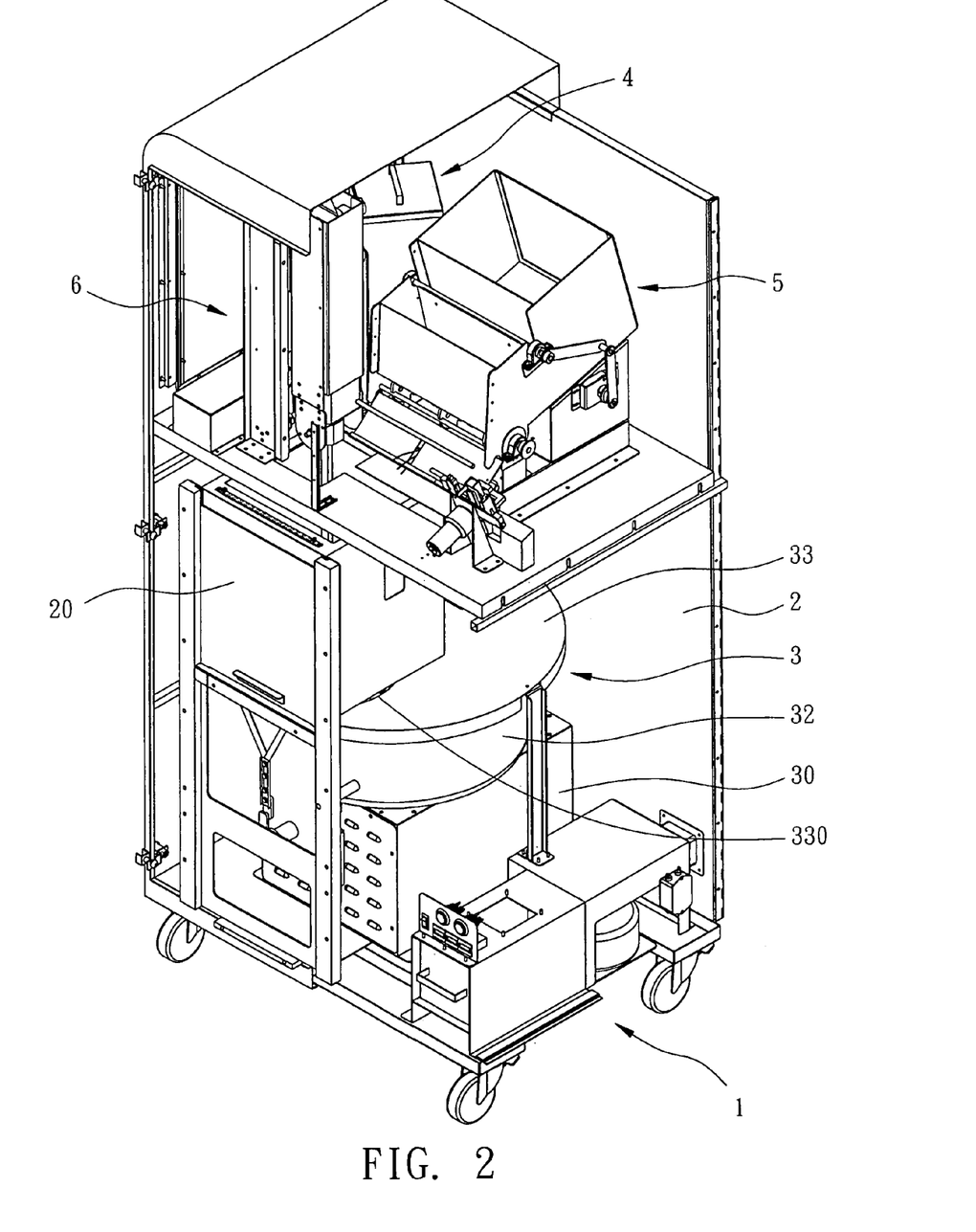
FIG. 2 is another perspective view of the machine shown in FIG. 1, with some portions of a shell removed.
Figure 3:
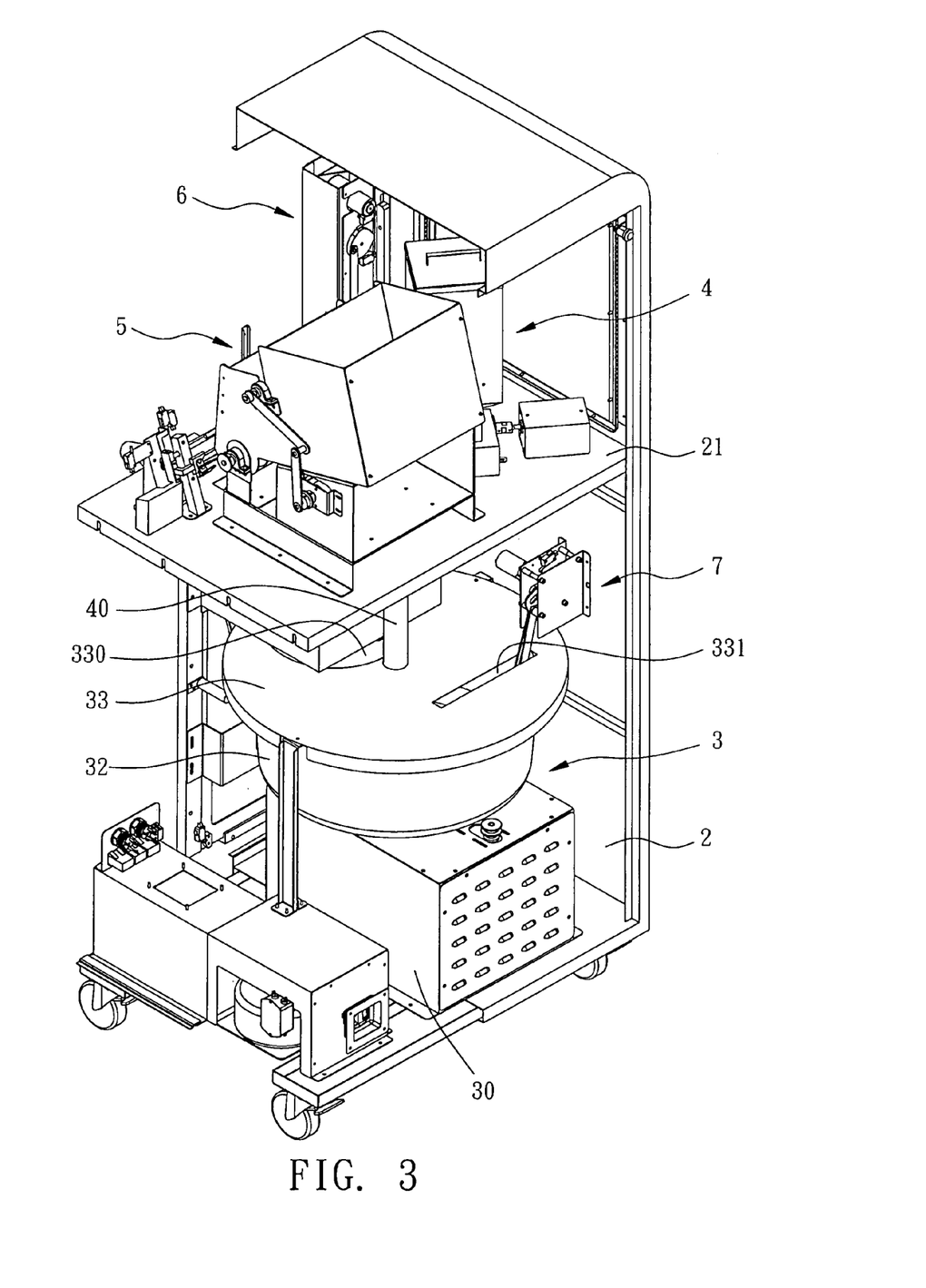
FIG. 3 is another perspective view of the machine shown in FIG. 2.

Referring to FIGS. 1 to 3, a machine 1 for making cotton candy includes a shell 2, a sugar-spinning unit 3, a sugar-feeding unit 4, a rod-storing unit 5, a rod-feeding unit 6 and a scraping unit 7 according to the preferred embodiment of the present invention. The shell 2 includes a front panel and a door movably connected to the front panel. There is a board 21 located in and secured to the shell 2.

The sugar-feeding unit 4 is located on the board 21. Sugar is stored in the sugar-feeding unit 4 and fed to the sugar spinning unit 3 from the sugar-feeding unit 4. The sugar-feeding unit 4 includes a pipe 40 inserted into the bowl 32 through an aperture defined in the lid 33. The sugar is fed to the sugar spinning unit 3 from the sugar-feeding unit 4 through the pipe 40.

The sugar-spinning unit 3 includes a motor 30, a heater 31, a bowl 32 and a lid 33. The motor 30 is located on a floor of the shell 2. The heater 31 (FIG. 6) is rotationally located in the shell 2 and driven by the motor 30. The bowl 32 is also rotationally located in the shell 2 and driven by the motor 30.

Figure 6:
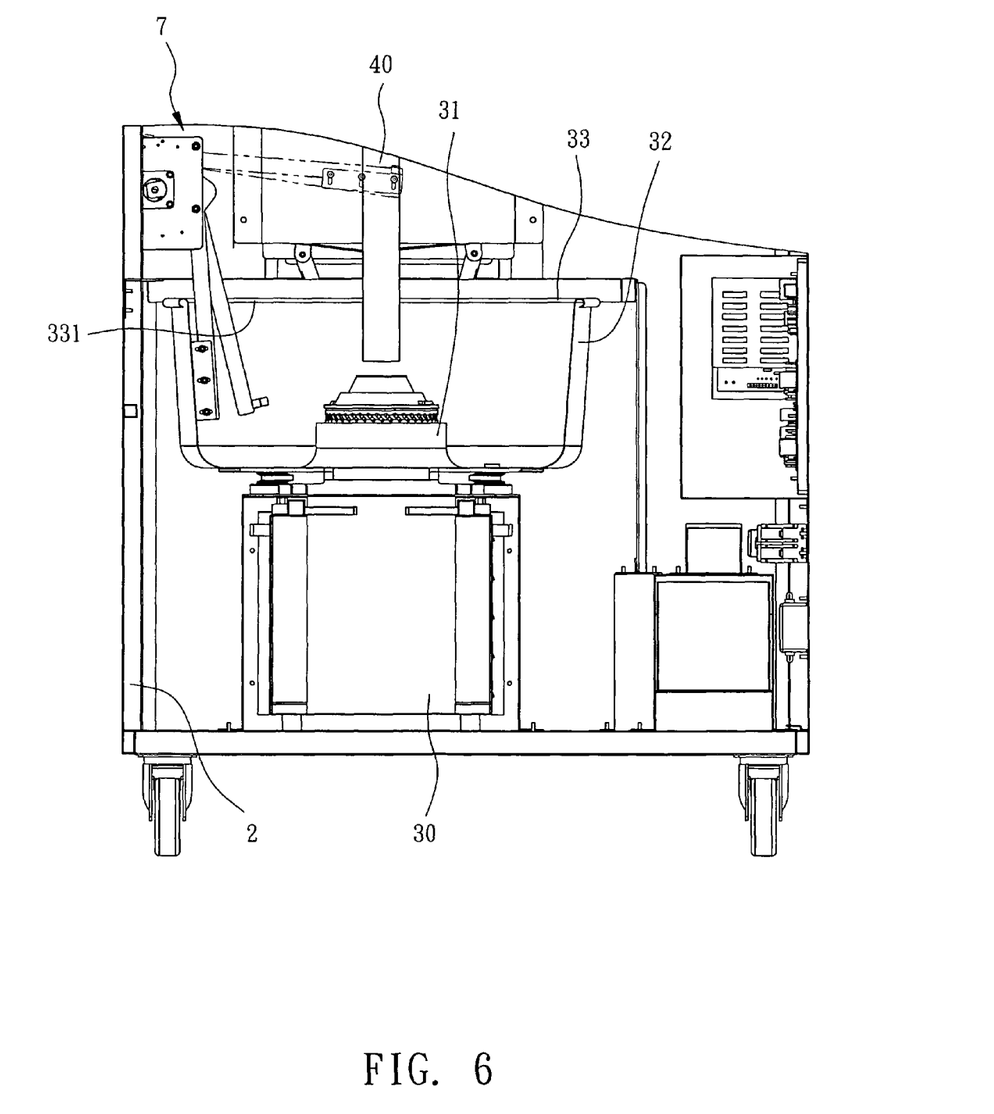
FIG. 6 is a cut-away view of the machine shown in FIG. 2.

The bowl 32 is coaxial with the heater 31. The lid 33 is located on the bawl 32. The lid 33 includes an opening 330 defined therein and a first slot 331 also defined therein. The sugar is heated and molten by the heater 31 and spun into the bowl 32 from the heater 31. Dust, grease and any other contaminants are kept out of the bowl 32 by the lid 33.

The rod-storing unit 5 and the rod-feeding unit 6 are also located on the board 21. Rods for carrying the spun sugar or cotton candy are horizontally stored in the rod-storing unit 5. One after another, the rods are horizontally transferred to the rod-feeding unit 6 from the rod-storing unit 5. By the rod-feeding unit 6, each of the rods is turned for the right angle so that it extends vertically. By the rod-feeding unit 6, each of the rods is inserted into the bowl 32 through the opening 330 to carry some of the spun sugar and moved from the bowl 32 via the opening 330 after carrying a predetermined amount of the spun sugar. Finally, the spun sugar is taken from the shell 2 through the door 20.

Referring to FIGS. 3 to 6, the scraping unit 7 includes a holder 70, a lever 72, a first scraper 722, a second scraper 71, a difference motor 73, an axle 74, a tensile spring 75 and a crank 76. The holder 70 includes two plates located in and connected to the shell 2, with a gap 700 defined between the plates. The holder 70 includes a stopper 701 extending from one of the plates.

Figure 4:
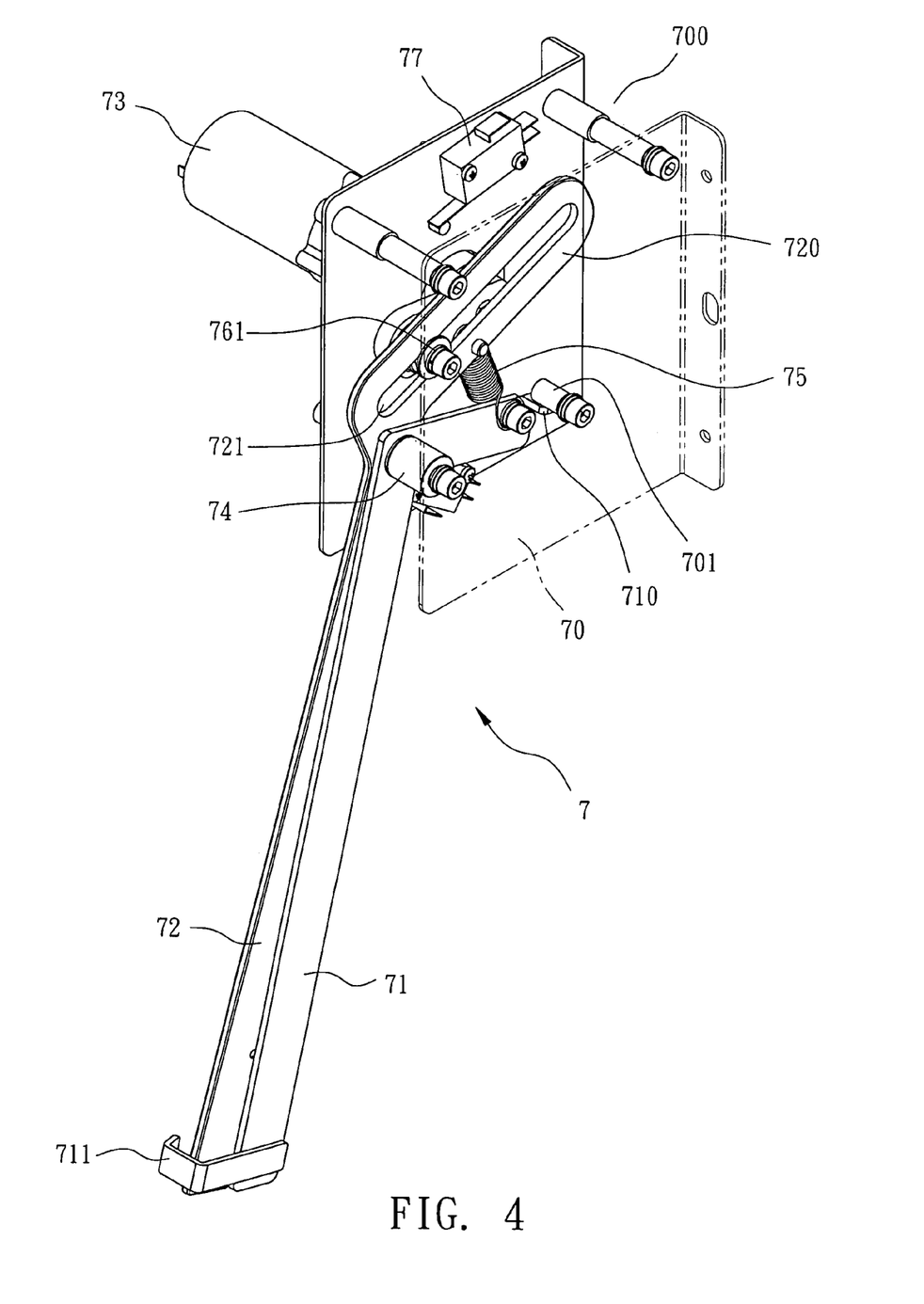
FIG. 4 is a perspective view of a scraping unit of the machine shown in FIG. 1.
Figure 5:
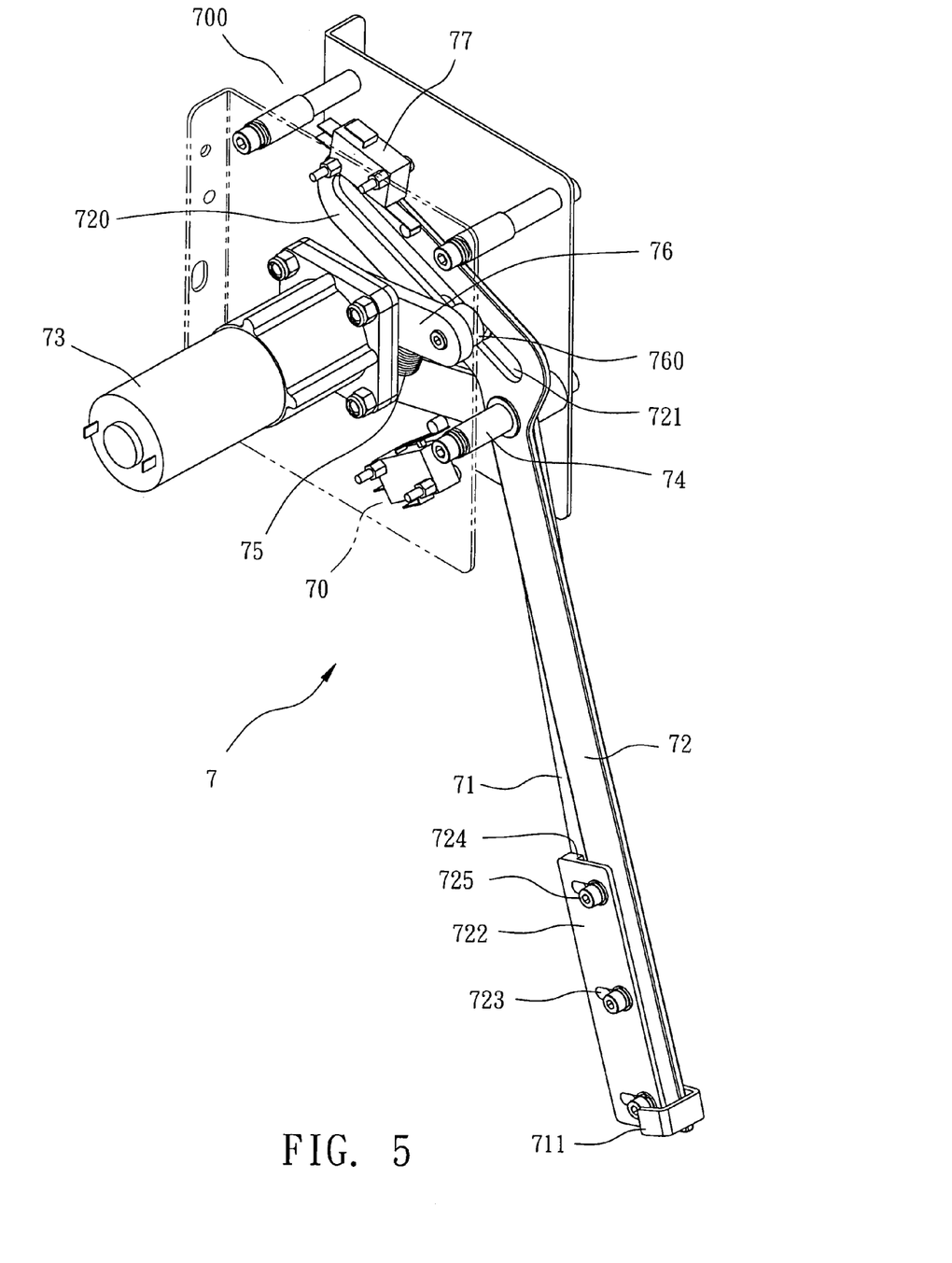
FIG. 5 is another perspective view of the scraping unit shown in FIG. 4.

The lever 72 includes a long section extending at an angle from a short section 720 located in the gap 700. The lever 72 includes a second slot 721 defined in the short section 720 and bosses 724 formed on the long section. A screw hole is defined in each of the bosses 724.

The first scraper 722 includes third slots 723 defined therein. The first scraper 722 is located against the long section of the lever 72, with each of the bosses 724 movably located in a related one of the third slots 723. A screw 725 is driven into the screw hole defined in each of the bosses 724 through a related one of the third slots 723. Thus, the first scraper 722 is connected to the long section of the lever 72. The position of the first scraper 722 relative to the long section of the lever 72 is adjustable because of the third slots 723. The lever 72 is also pivotally connected to the plates of the holder 70 by the axle 74.

The second scraper 71 is an L-shaped element with a long section extending from a short section located in the gap 700. The second scraper 71 includes a tab 710 extending from the short section and a hook 711 connected to the long section. The tab 710 is used for contact with the restraining element 701. The hook 711 is used to hook the lever 72. The second scraper 71 is pivotally connected to the plates of the holder 70 by the axle 74.

The tensile spring 75 includes an end connected to the short section of the second scraper 71 and another end connected to the short section 720 of the lever 72. Thus, the second scraper 71 is elastically connected to the lever 72 by the tensile spring 75.

The crank 76 includes an end operatively connected to a mandrel 730 of the difference motor 73 and another end connected to a pin 760 movably inserted in the second slot 721. A bearing 761 is provided on the pin 760. The movement of the pin 760 along the second slot 721 is rendered smooth by the bearing 761. The lever 72 and the second scraper 71 can be pivoted by the difference motor 73 via the crank 76 and the tensile spring 75.

The scraping unit 7 may include a sensor 77 attached to the holder 70. The crank 76 can be detected by the sensor 77. Thus, the operation of the difference motor 73 can be detected by the sensor 77.

Figure 7:
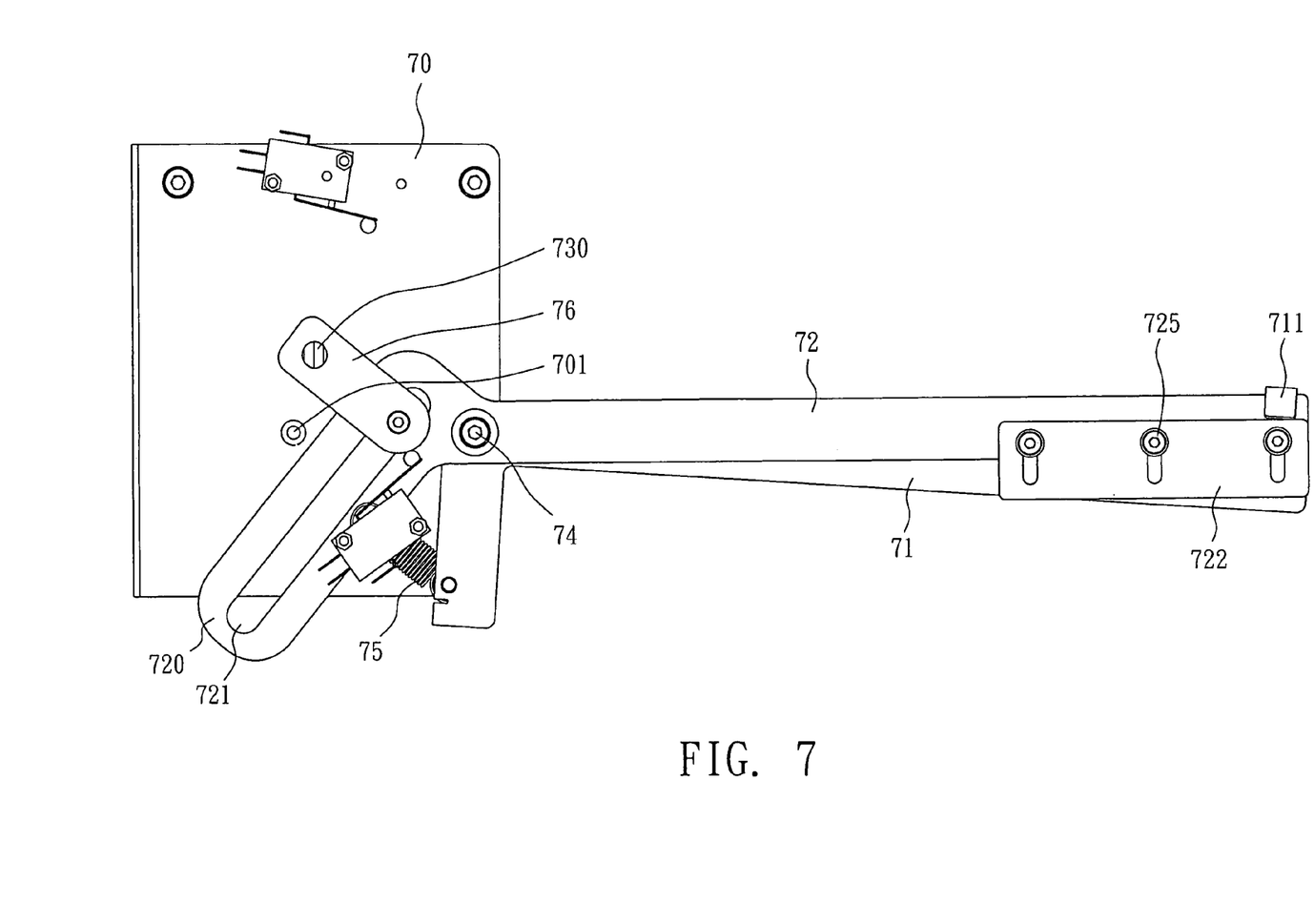
FIGS. 7 to 10 are side views of the scraping unit shown in FIG. 4.

Referring to FIG. 7, the second scraper 71 and the lever 72 are located horizontally outside the bowl 32, i.e., above the lid 33. The second scraper 71 and the lever 72 are aligned with the first slot 331. The first scraper 722 dangles from the lever 72 because of its weight. The bearing 761 is located in a first end of the second slot 721.

Figure 8:
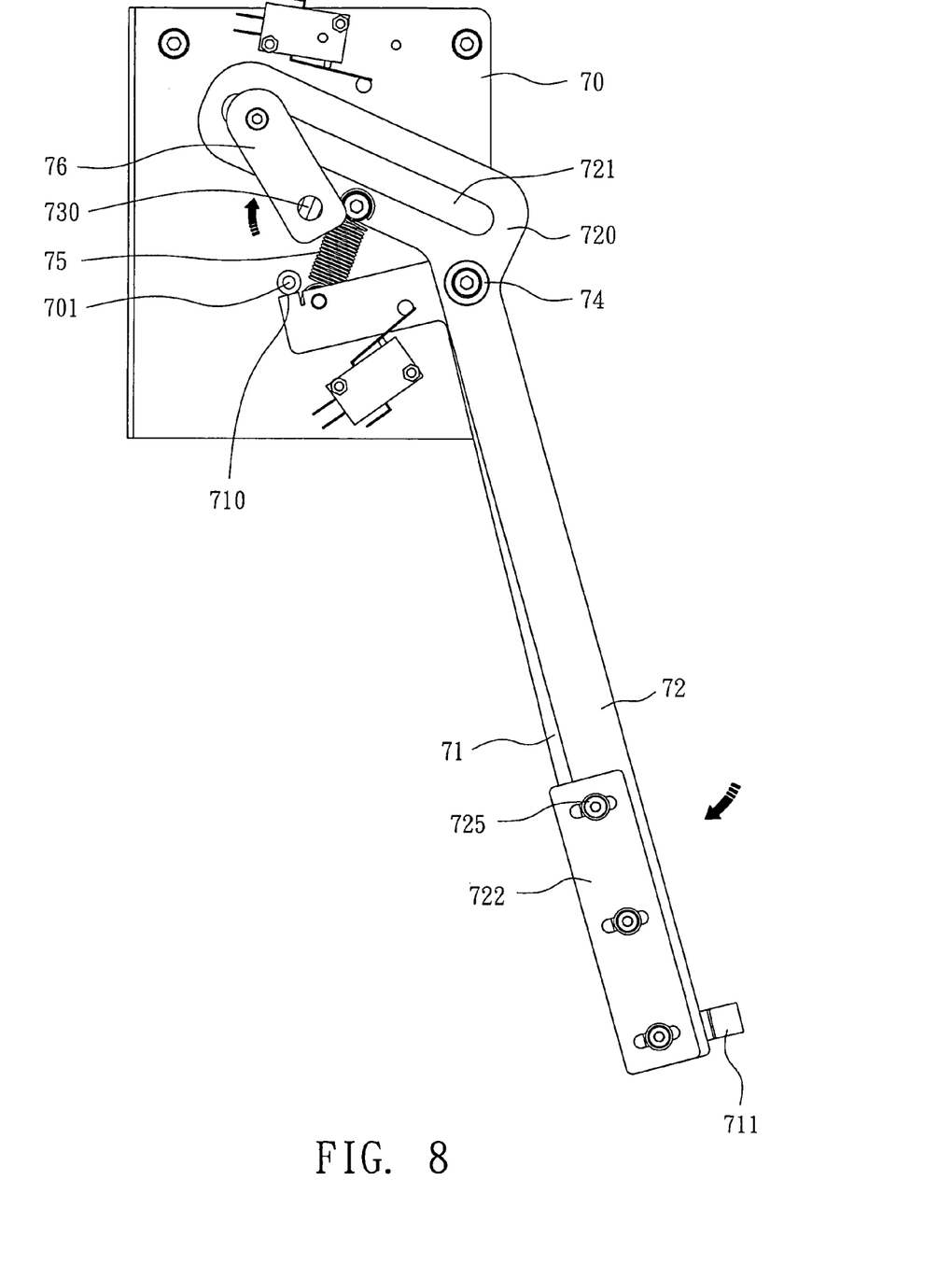

Referring to FIG. 8, to scrap stains of sugar from an internal side of the bowl 32, the difference motor 73 is actuated to spin the crank 76. The bearing 761 is moved to a second end of the second slot 721 from the first end while the second scraper 71 and the lever 72 are pivoted, about the axle 74, down into the bowl 32 through the first slot 331.

Figure 9:
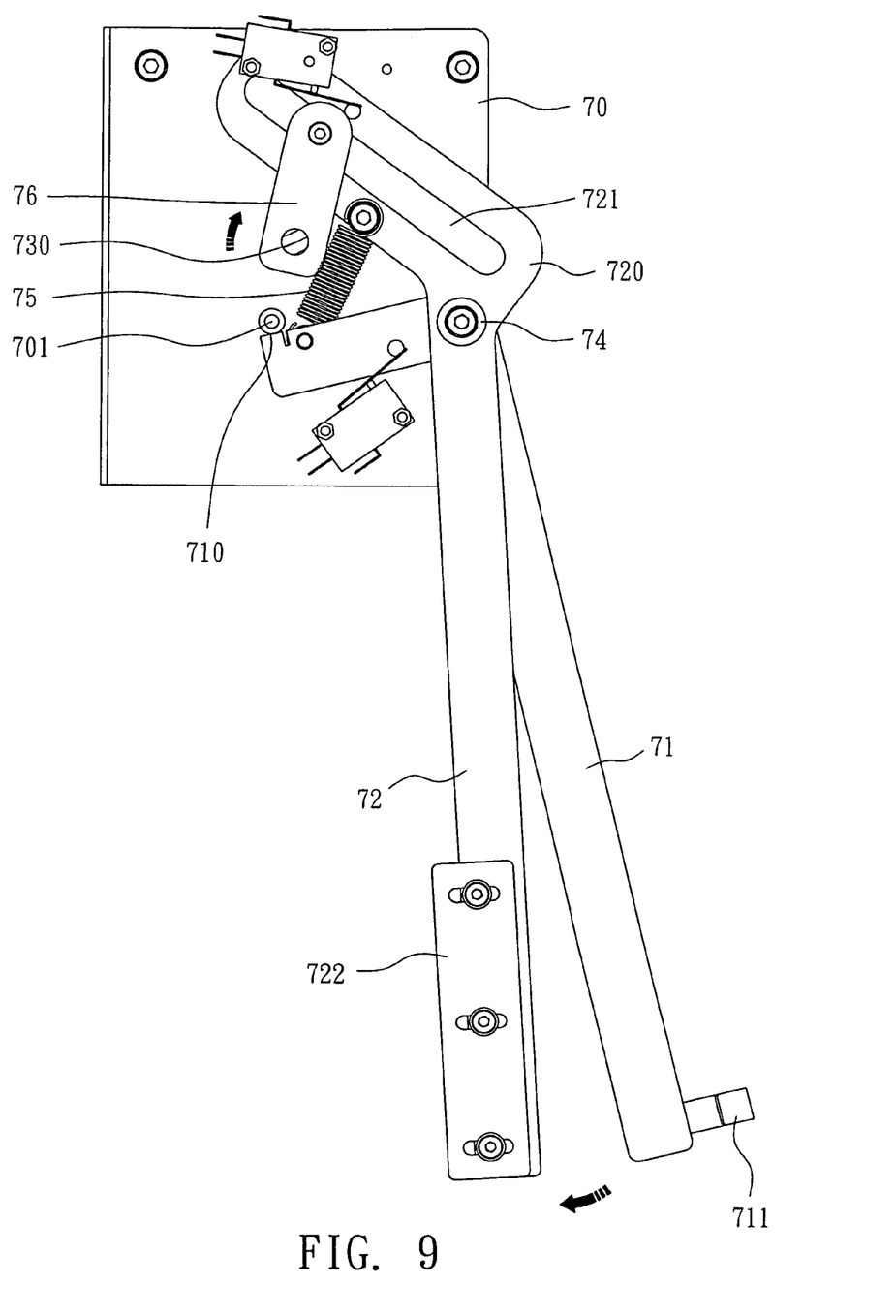

Referring to FIG. 9, the lever 72 continues to be pivoted while the second scraper 71 is stopped by the stopper 701. The lever 72 is released from the hook 711. The lever 72 abuts the first scraper 722 against the internal side of the bowl 32 through the bosses 724. Then, the difference motor 73 is turned off immediately while the motor 30 is actuated to spin the bowl 32. Thus, the stains of sugar are scrapped from the internal side of the bowl 32 by the first scraper 722.

Figure 10:
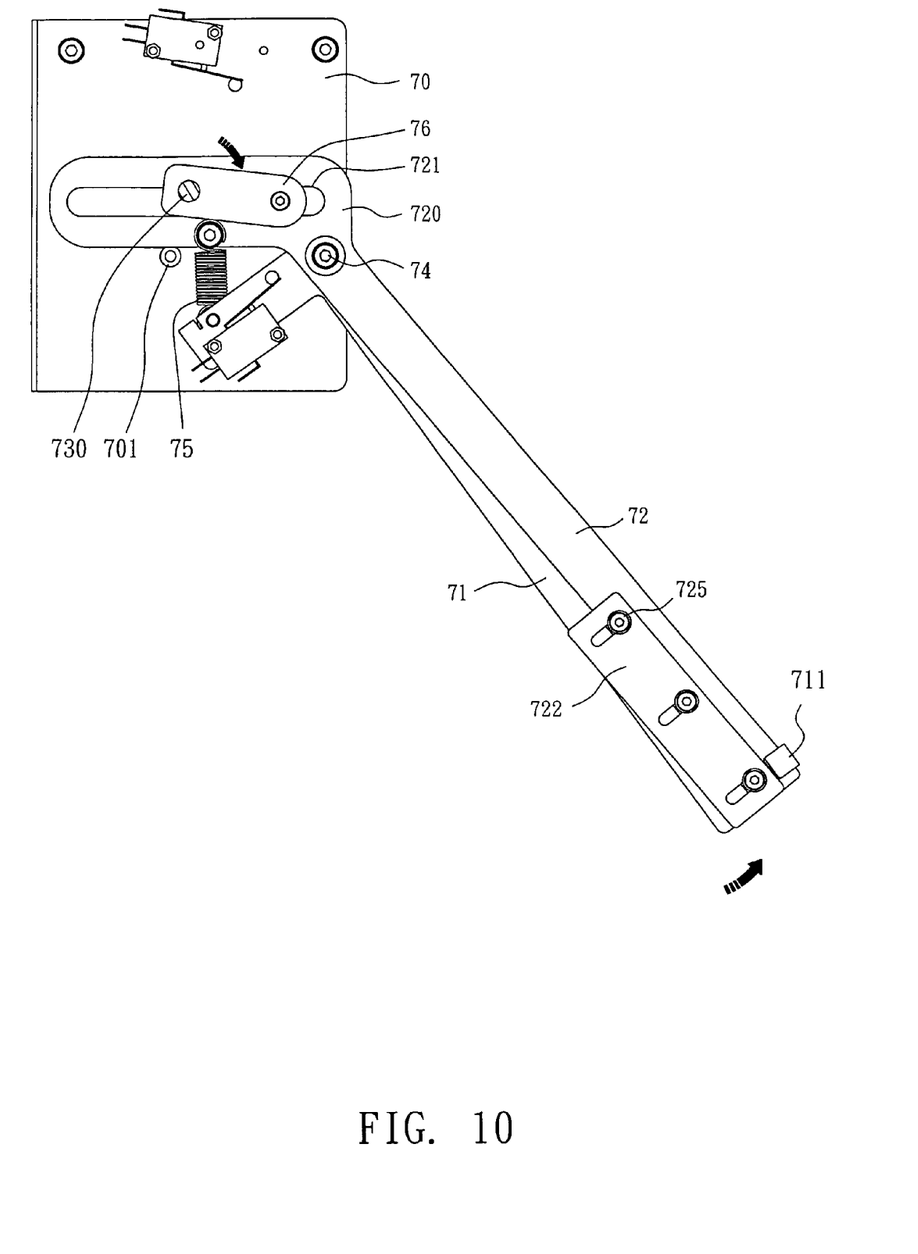

Referring to FIG. 10, the difference motor 73 is actuated again to pivot the second scraper 71 and the lever 72. The bearing 761 is moved back to the first end of the second slot 721 from the second end. The second scraper 71 and the lever 72 are pivoted in an opposite direction. As the crank 76 is spun to a predetermined position, the tab 710 of the second scraper 71 is released from the stopper 701, and the second scraper 71 is pivoted past the first scraper 722 attached to the lever 72 by the tensile spring 75. Thus, the stains of sugar are scrapped from the first scraper 722 by the second scraper 71. Moreover, the lever 72 is hooked by the hook 711 again. This happens after the second scraper 71 and the first scraper 722 attached to the lever 72 are moved out of the bowl 32 through the first slot 331. Finally, second scraper 71 and the lever 72 are returned to the original position shown in FIG. 7.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A machine for making cotton candy including: a shell (2); a sugar-spinning unit (3) including: a heater (31) located in and connected to the shell (2) for heating and melting sugar; a bowl (32) coaxially located around the heater (31); a lid (33) located on the bowl (32) and formed with a first slot (331); and a primary motor (30) for spinning the heater (31) and the bowl (32) to spin the molten sugar into the bowl (32) from the heater (31); and a scraping unit (7) including: a holder (70) including two plates located in and connected to the shell (2), with a gap (700) defined between the two plates; a stopper (701) connected to the holder (70); a lever (72) including a second slot (721) defined therein; a first scraper (722) connected to the lever (72); a second scraper (71) pivotally connected to the plates of the holder (70); a hook (711) connected to the second scraper (71) and adapted to hook the lever (72); an axle (74) inserted in the holder (70) and the lever (72) and the second scrapper (71); a tensile spring (75) for connecting the second scraper (71) to the lever (72); a difference motor (73) including a mandrel (730); a crank (76) including an end connected to the mandrel (730) of the difference motor (73); and a pin (760) connected to an opposite end of the crank (76) and movably inserted in the second slot (721) defined in the lever (72), wherein the lever (72) and the second scraper (71) can be pivoted, by the difference motor (73) via the crank (76) and the tensile spring (75), into the bowl (32) through the first slot (331) defined in the lid (33), wherein the lever (72) can continue to be pivoted after the second scraper (71) is stopped by the stopper (701) so that the first scraper (722) is located against an internal side of the bowl (32) to scrap stains of sugar from the bowl (32), wherein the lever (72) and second scraper (71) can be pivoted back so that the second scraper (71) is released from the stopper (701) and pivoted past the first scraper (722) by the tensile spring (75) to scrap the stains of sugar from the first scraper (722).

2. The machine according to claim 1, wherein the first scraper (722) includes third slots (723) through which screws (725) are driven into the lever (72) so that the position of the first scraper (722) relative to the lever (72) is adjustable.

3. The machine according to claim 2, wherein the first scraper (722) includes bosses (724) movably located in a related one of the third slots (723) defined in the first scraper (722).

4. The machine according to claim 1, wherein the tensile spring (75) includes an end connected to a short section of the second scraper (71) and another end connected to a short section (720) of the lever (72).

5. The machine according to claim 1, including a bearing (761) located around the pin (760).

6. The machine according to claim 1, including a sensor (77) connected to the holder (70) for detecting the crank (76).

* * * * *